June 22, 1971 J. H. ENICKS 3,585,639
PROTECTIVE ATHLETIC PAD
Filed Feb. 24, 1969 3 Sheets-Sheet 1
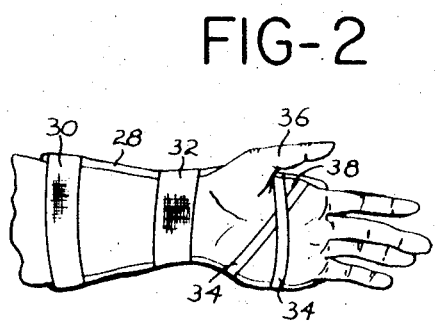
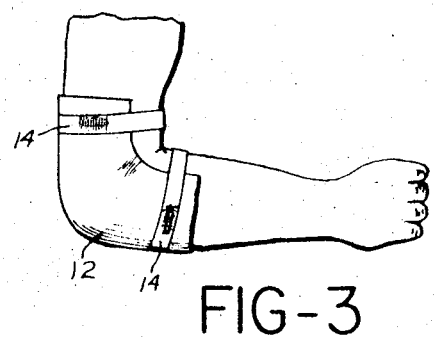
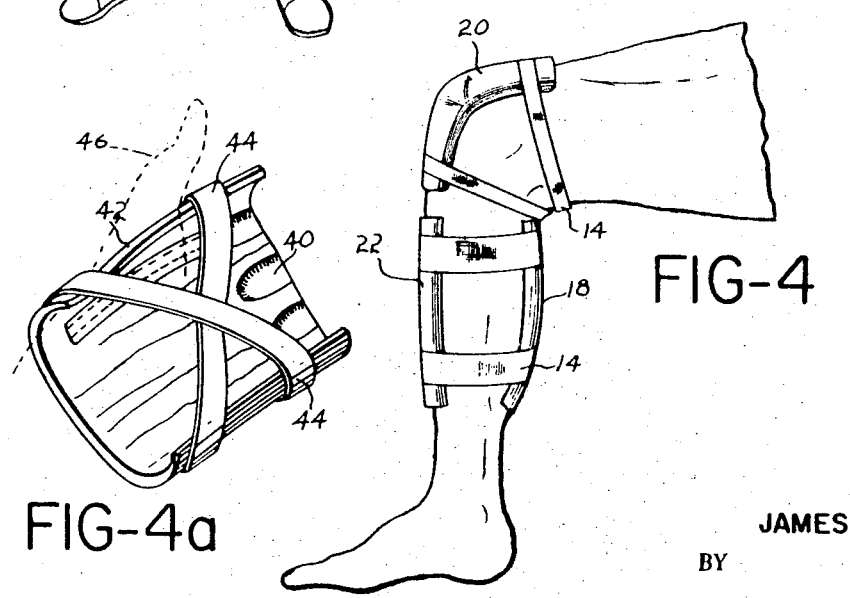
INVENTOR.
JAMES H. ENICKS
BY June 22, 1971 J. H. ENICKS 3,585,639
PROTECTIVE ATHLETIC PAD
Filed Feb. 24, 1969 3 Sheets-Sheet 2

1. APPLYING A THIN LAYER OF PLASTISOL SKIN TO THE MOLD.

2. HEATING THE MOLD AND SKIN.

3. POURING IN PLASTISOL WITH BLOWING AGENT FOR FORMING EXPANDED MEMBER.

4. HEATING FOR PARTIAL BLOWING OF EXPANDED MEMBER AND PARTIAL FUSION OF SKIN THERETO.

INVENTOR.
JAMES H. ENICKS
BY

June 22, 1971  J. H. ENICKS  3,585,639
PROTECTIVE ATHLETIC PAD
Filed Feb. 24, 1969  3 Sheets-Sheet 3
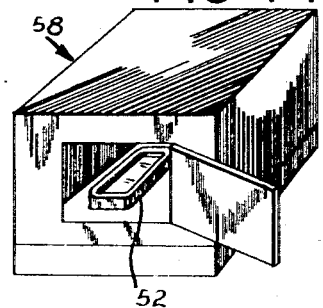
5. APPLYING REINFORCING STRIPS WHERE NECESSARY AND APPLYING SKIN LAYER OVER PARTIALLY EXPANDED MEMBER.
6. HEATING TO COMPLETE BLOWING OF EXPANDED MEMBER AND FUSING SKIN THERETO.
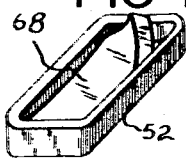
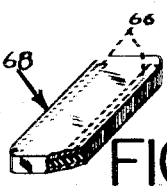
7. COOLING AND REMOVING PAD FROM MOLD.
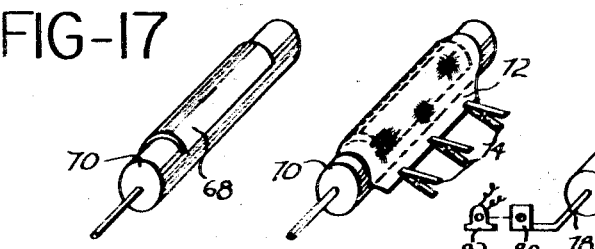
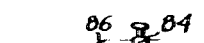
8. CONTOUR FORMING A WARMED PAD OVER A MOLD.
9. COMPLETED FOREARM AND ELBOW PAD.
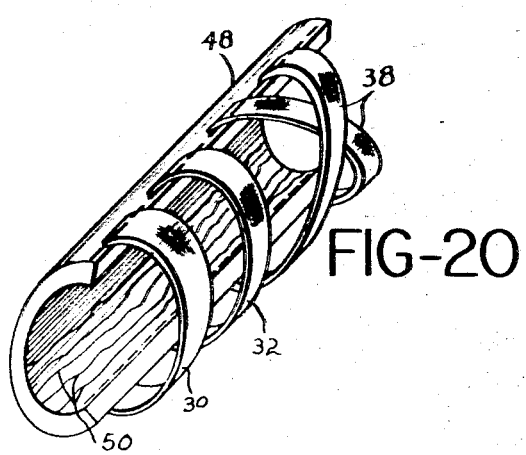
INVENTOR
JAMES H. ENICKS
BY United States Patent Office 3,585,639
Patented June 22, 1971

3,585,639
PROTECTIVE ATHLETIC PAD
James H. Enicks, Greenville, Ohio, assignor to
Johnson & Johnson
Continuation-in-part of application Ser. No. 422,788, Dec. 31, 1964, now Patent No. 3,446,788. This application Feb. 24, 1969, Ser. No. 801,490
Int. Cl. A41d 13/06
U.S. Cl. 2—22          4 Claims

ABSTRACT OF THE DISCLOSURE

An athletic pad and a method of manufacturing the pad, of which the body of the pad is a foamed plastisol material and at least a portion of the pad surface is skin-like and fluid impervious. Attaching straps, or bands, may be secured to the pad for connecting it to the body and reinforcing elements may be mounted in the pad for the connection of the straps or bands thereto.

---

This invention relates to padding for providing the human body with protection and to the method of making the same, and is particularly concerned with padding used in sporting activities such as football, basketball, soccer, etc., wherein the players are exposed to frequent body contact.

This application is a continuation-in-part of my copending application, Ser. No. 422,788, filed Dec. 31, 1964, entitled Method of Manufacturing a Protective Athletic Pad, now Pat. No. 3,446,880.

Athletic protective pads are known and, heretofore, have been fabricated from combinations of leather, cloth, fabrics, plastic, etc., which have been reinforced with relatively rigid materials. Such pads have proved to be cumbersome, expensive, subject to rotting or decaying from the perspiration of the wearer and generally unsatisfactory.

Some of the prior art pads have also been covered with protective layers to guard against perspiration; however, such layers tended to peel away from the base of the pad as a result of deterioration by the perspiration or as a result of being pulled off by adhesive tapes which are frequently used to secure the pads in position.

The pads made according to the present invention are made from plastisols which are dispersions of polyvinyl chloride resins in liquid plasticizers.

In making pads according to the present invention, a mold for the particular pad being made is covered with a thin layer of plastisol skin with no blowing agent therein. After heating and cooling, a designed amount of the plastisol with a blowing agent therein is placed in the mold over the aforementioned skin and the mold is then placed in an oven and heated. The plastisol with the blowing agent therein comprises the main cushioning member for the pad. After the mold is removed from the oven, reinforcing means may be positioned on top of the cushioning member now partially formed, and an additional layer of plastisol skin with no blowing agent therein is applied thereover, if desired. The mold with the contents therein is again placed in an oven and heated to complete the fusing and blowing of the cushioning member and is subsequently removed and cooled.

The pad as produced from the above process has the cushioned layer sandwiched between skin layers which are integrally joined thereto. The pad provides excellent shock absorbing properties with and has a surface in the form of a skin that lends itself readily to taping without peeling upon subsequent removal of the tape. With the reinforcement means in the pad, securing straps can be secured thereto to enable the pad to be secured to the wearer.

After the pads are removed from the above mold; and which may be generally planar in nature, the pad may be placed around another pattern of some shape, such as that of a human hand and forearm, and heated to form the generally planar pad into a contoured pad which will fit the back of the hand, the wrist and the forearm, for example. It is understood, of course, that the specific shape of the pad will be dictated by its intended use and while mention is here made of using the pad in connection with sporting activities, it is also possible to use the pad and the method of making the pad in connection with medical or orthopedic applications.

With the foregoing in mind, a primary object of this invention is to produce a protective pad for use in sporting activities such as football, and which pad is light in weight, economical, and affords the user excellent protection from extreme physical blows.

A further object of this invention is to provide a pad which is readily secured to the wearer, and which pad has a skin which is resistant to the deleterious effects of perspiration and which will not peel from the pad.

Another object of this invention is to produce a basic pad structure which can be fitted to any part of the human body and which may have suitable reinforcing means therein for securing the pad on the wearer.

A further object of this invention is to produce an economical method for producing the pads of this invention.

A still further object of this invention is to produce a method of contour shaping the pads of this invention.

These and other objects and advantages of this invention will be understood more readily in connection with the following specification and drawings in which:

FIG. 1 is a view of a man wearing the different forms of this invention which the protective pad may take;
FIG. 2 is a view of the hand and wrist pad shown in FIG. 1;
FIG. 3 is a side view of an elbow pad on the wearer;
FIG. 4 is a side view of knee, leg calf and shin pads;
FIG. 4a is a perspective view of a wrist and knuckle pad;
FIG. 5 shows the first step of the method in which the plastisol skin is applied to the mold;
FIG. 6 is a cross section of FIG. 5 taken along the lines VI—VI thereof;
FIG. 7 shows a perspective view of the mold with the skin in an oven;
FIG. 8 shows a perspective view of the plastisol with the blowing agent therein being poured into the mold with the heat cured skin thereon;
FIG. 9 is a perspective view of FIG. 8 taken along lines IX—IX thereof prior to expansion of the plastisol which will become the main cushioning member of the pad;
FIG. 10 is a perspective view of the oven in which the elements shown in FIGS. 8 and 9 are heated;
FIG. 11 shows how the plastisol is expanded after heating;
FIG. 12 shows reinforcing strips in position on top of the expanded plastisol and the spraying of the top skin of plastisol;
FIG. 13 shows a partial cross section of the elements in the mold prior to heating;
FIG. 14 shows heating of the mold and contents shown in FIG. 13;
FIG. 15 shows the pad being removed from the mold;
FIG. 16 shows a perspective view of the pad in planar form which will be developed into the molded contour forearm pad shown in FIG. 20;
FIG. 17 is a perspective view of a forearm pad positioned on a forming mandrel;

FIG. 18 is a perspective view of the means for securing the pad to the form while the contoured shape is set;

FIG. 19 is a perspective view of vacuum operated means for securing the pad to the form while the contoured shape is set;

FIG. 20 shows the finished forearm pad with the means for securing it to the forearm of the wearer; and FIG. 21 is a generally schematic view showing how the process may be made continuous on a conveyorized system.

Figure 5:
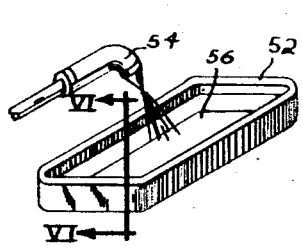

Referring to the drawings in more detail, FIG. 1 shows a man wearing the different forms of the invention which the protective pad may take. They include an upper arm pad 10 and an elbow cup pad 12, each of which is secured to the user by knit elastic straps 14 of known variety. The straps 14 are circumferential in nature and are applied as one would apply garters.

Other pads shown are knee pad 16 which also covers a portion of the thigh, leg calf pad 18, knee cup 20, shin pad 22, and side pad 23. Each of these pads is secured in place by the elastic straps 14, although they may also be taped in position.

FIG. 1 also shows a shoulder pad 24 which may be taped in position by adhesive tapes 26 as shown. The tape may be secured to the body of the wearer or on to a garment as shown.

Each of the pads is free of sharp edges and is made of a plastisol which has a skin integrally fused to the foamed structure between the skins. The pads may be flesh colored and are extremely flexible and lightweight. Although the skin of the pad is smooth, the surface is not slippery, but tends to cling, which aids in retaining the pad on garments, or in place against skin of the wearer.

FIGS. 1 and 2 show a hand pad 28 which covers the lower third of the arm, the wrist, and the back of hand and knuckles. This pad provides excellent protection for linemen playing football. This pad, along with the others, is generally semi-circular in cross section and has a convex outer side, and a concave side which is worn next to the body.

The means for securing the arm pad 28 to the body include elastic knit straps 30 and 32 which are secured to opposed sides of the pad and smaller criss-cross straps 34 which are also secured to opposed sides. The thumb 36 in FIG. 2 may be positioned between the criss-cross member at 38 instead of to one side as shown to provide for a better grasp. The pad has recesses 40 formed to accommodate the knuckles as shown in the knuckle pad 42 of FIG. 4a. The pad 28 has scalloped edges 29 over the knuckles as shown in FIG. 1.

FIGS. 3 and 4 show pads of other shape secured to other parts of the body.

FIG. 4a shows a knuckle pad 42 which also protects the back of the hand. The pad has a generally semi-circular shape in cross section and has elastic straps 44 secured to the convex side which are in criss-cross relation to each other as shown. The thumb 46, shown in dashed outline, is positioned between the criss-cross straps to provide for freedom of grasp.

FIG. 20 is a perspective view of a forearm pad 48 showing the side which is worn against the arm, the opposite side of the pad being shown in FIG. 1. The means of securing the pad to the arm consists of elastic straps 30 and 32 along with straps 38 which are similar to the straps shown in FIG. 2. The concave side of pad 48 contains the wrinkles 50 which provide some trapped air spaces, which tend to make the pad more comfortable in use.

The pads according to this invention are premolded to fit and the outer skin and the foam structure are made at one time to give a complete bond therebetween. The skin will not crack, peel loose, or break down, nor will it tear upon the removal of tape used to secure the pad to the body.

The skin can be a relatively soft skin or it can be made to be relatively stiff, depending upon the use of the pad.

METHOD OF MAKING PADS

FIG. 5 shows a mold 52 which has a cavity therein shaped for the particular pad to be produced. The mold is advantageously constructed of a ceramic material to withstand the temperatures used. The surface of the mold is smooth to impart a smooth surface to the pad shaped therein.

The materials used for the pads are plastisols which are dispersions of polyvinyl chloride resins in suitable liquid plasticizers for instance, phthalate, which normally are used to form solid plastic toys, for example. A suitable blowing agent is added to form the plastisol solids into an extremely tough foam which will absorb a very high degree of shock and which will readily lend itself to contour molding or shaping. The plastisol foam is chemically resistant to most acids, alkalies, detergents, oils, and some solvents. The amount of blowing agent used is varied to give the size and number of cells desired in the foam.

Figure 6:
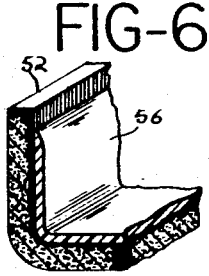

In preparing the pad, a nozzle 54 connected to a supply source of plastisol is used to spray a thin layer 56 of plastisol on the bottom and sides of the mold 52 as shown in FIGS. 5 and 6. The height of the skin along the sides of the mold is determined by the thickness of the pad to be made. Generally the thickness of the skin is approximately $\frac{1}{32}$ inch or less, depending upon the size of the pad.

Figure 7:
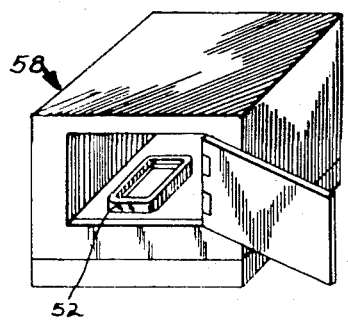

After the above plastisol skin without blowing agent is sprayed on the mold, the mold is placed in an oven 58 as shown in FIG. 7. The oven is maintained at a temperature of 375° F. and the mold remains therein for about 5 minutes and is then removed and cooled at room temperature.

Figure 8:
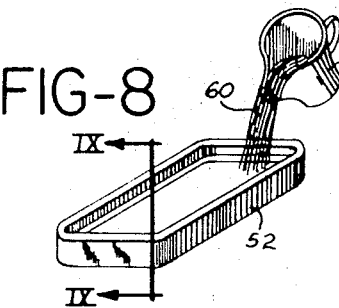
Figure 9:
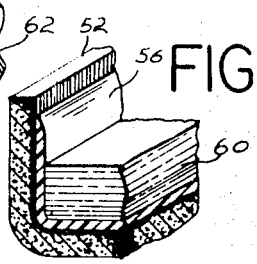
Figure 10:
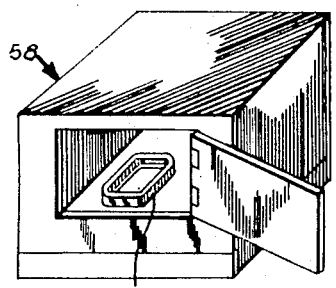
Figure 11:
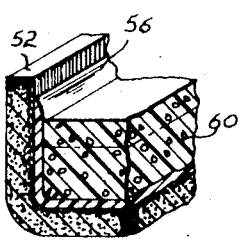

After cooling, a designated amount of cushioning material 60 (plastisol with a blowing agent) is poured from a container 62 into the mold as shown in FIGS. 8 and 9. The mold with the contents therein is then placed in the oven 58 at a temperature of 375° F. for approximately 5 minutes to jell the cushioning material and partially to fuse the skin to the cushioning material.

Figure 12:
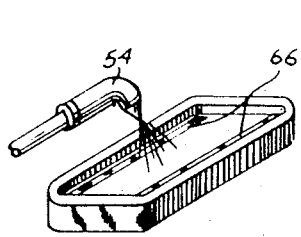
Figure 13:
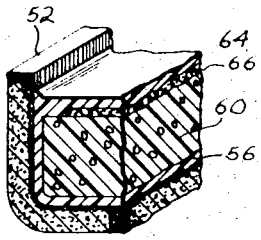

The mold is then removed from the oven and the top of the cushioning member, namely, the plastisol with the blowing agent therein is immediately sprayed with a layer of plastisol skin 64, without a blowing agent therein, to for a further skin for the pad, as shown in FIGS. 12 and 13. For those pads which are to be reinforced, suitable flexible textile reinforcing strips 66, or their equivalents, are positioned on top of the plastisol cushion member or layer 60 and the skin 64 is sprayed thereover, as shown in FIGS. 12 and 13.

The mold and contents are then immediately placed in oven 58 at approximately 375° F. for about 16–23 minutes to complete the fusing of the skins to the cushion member 60 and to complete the blowing of the cushion member 60.

The mold 52 is then removed from the oven and the completed pad 68 is removed therefrom by simply lifting it out.

It should be noted that the pad 68 is not made and then dipped to have the skins formed on the cushion member. The entire pad is constructed at one time and is made from one and the same plastisol.

As removed from the mold, the pad 68 is generally planar in form and may be used as such with suitable means for securing the pad to the body; however, the pad performs better when it is molded to fit the contour of the body. The contour molding may be accomplished as follows:

A form 70, such as the one shown in FIG. 17, may be used to form the contour of the pad. The pad 68, as taken from the mold, may be placed on a tray and placed in an oven, such as 58, which has a temperature of 300° F., and the pad may be heated therein for about 7 minutes to rewarm the pad. After the pad is warmed, the pad is placed around the mold as shown in FIG. 17 and a binder, such as the power knit elastic fabric 72, similar to that used in ladies girdles, is placed on the pad and tensioned so as firmly to hold the pad against the form until the pad is cool. Clips 74 hold the elastic fabric 72 taut until the shape of the pad is set by cooling.

After cooling, the pad is removed from the form and it will retain its shape. The specific shape of the mold shape 70 will, of course, be dependent upon the intended use of the pad and may take the form of a knee joint, hand and wrist, shoulder, etc. The straps may be then stitched on the pads as shown.

FIG. 19 shows another means for contour molding the pad. It includes a form or mold 76 which has a plurality of apertures 77 therein, which communicate with the interior of the mold and are connected by conduit means 78 to a source of vacuum 80 which is powered by a motor 82. The other end of the mold has a valve 84 in a conduit 86 which is connected to the interior of the mold.

After the pad 68 is placed on the mold, the vacuum generated at 80 will secure the pad thereagainst, and after cooling, the valve 84 may be opened to connect the interior of the mold to the atmosphere and thereby release the pad from the mold.

In the contour molding process, the concave side of the pad may have a plurality of wrinkles 50 therein as shown in FIG. 20.

Pad 48 shown in FIG. 20 has elastic means for securing the pad to the arm. The ends of the straps are sewn to the pad through the reinforcing means in the pad.

While the method of producing the pad has been shown relating to the production of one pad, it is understood that the process herein disclosed may be readily adapted to a continuous process in which the mold 52 may be passed along a conveyor which travels under a plurality of stations, for the spraying, heating, cooling, filling, heating and cooling operations mentioned. Instead of spraying the plastisol. other application means such as by brush may be used.

FIG. 21 shows an endless conveyor 88 which may be used for forming the pad of this invention in a continuous process. The mold 52 is placed on the conveyor as shown. Several molds may be placed in side to side relation on a wide conveyor. The nozzle means 54 on a flexible conduit may be used to spray the plastisol skin in the molds.

The molds are then routed through an oven 90 having flap type doors 92 on the entrance and exit ends. The speed of the conveyor and length of the oven 90 are arranged to obtain the heating times mentioned earlier.

After the heating, air blast nozzles 94 discharging cool air may be used to cool the molds to room temperature. The molds and cooled skins therein then pass under a hopper 96 having a throttle valve 98 therein for discharging the plastisol with blowing agent therein into the molds.

The mold and contents therein are then routed through a second oven 100 whose length is correlated to the conveyor speed to obtain the necessary time in the oven mentioned earlier.

After coming out of the oven 100, the reinforcing means are positioned on top of the partially blown plastisol and a plastisol skin is sprayed thereover by nozzle means 102.

The mold then enters the final oven 104 where the complete fusing and blowing takes place. After coming out of the oven, the pad may be removed from the mold. Operators may be positioned at the various stations along the conveyor to control the discharging of the plastisol and the application of the reinforcing means where necessary.

The method explained in detail above is not the only method of arriving at a satisfactory protective member of the nature referred to. In the process described above, the member has an integral skin in complete enclosing relation thereto and the skin and the body of the protective member are heat treated individually and thereafter in combination.

It has been discovered, however, that a satisfactory protective member can be formed in a somewhat different manner while eliminating a portion of the outer skin.

In the second mentioned process, there is sprayed into an open mold cavity a layer of high viscosity known nonfoaming plastisol which is to say, a plastisol without a blowing agent therein. Immediately thereafter, plastisol containing a blowing agent is dispensed into the mold cavity on top of the high viscosity layer and the mold is then placed into an oven for curing, which may be done under conditions of time and temperature as mentioned above.

It has been found that the top skin layer can be eliminated in this manner, while the protective member retains substantially all of the advantageous characteristics of a protective member having a complete skin thereon.

Furthermore, upon removal of the mold from tthe oven, the now foamed protective member or pad is permitted to cool down to about 200 degrees Fahrenheit and then is removed from the open mold and placed on a forming mold and held or clamped tightly thereagainst, the said mold preferably being at about 200 degrees Fahrenheit itself. When the mold and work member are then completely cooled, the work member may be removed from the form and it will be found to be of the desired configuration. Reinforcing strips as explained in connection with the first modification may be imbedded in the material of the body of the protective member prior to the curing thereof, or the plastic members, when employed, may be stitched directly to the material of the body of the protective device.

The process just described eliminates the heating and cooling of the first skin member and eliminates a special step to gel the body material in foamed form, eliminates the step of applying a second skin and the reheating to cure the work member and fuse the skins together and, furthermore, eliminates reheating of the member after the first cure to enable it to be formed.

As a material for being employed in the manufacture of a protective member, I prefer a plastisol such as polyvinyl chloride compound and to this is added as a blowing agent, azodicarbonamide, for forming the body of the protective device.

It has also been discovered that athletic protective pads and like members having considerable merit with regard to absorption of shock and having high tear strength and being easily cleanable and being resistant to becoming corrosive can be manufactured by plasing in a mold cavity a plastosol material of the nature referred to containing a blowing agent without first having applied a layer of the plastisol material free of a blowing agent to the surface of the mold cavity.

In the practice of the process wherein no plastisol free of blowing agent is employed the plastisol with the blowing agent is placed in the mold cavity and is then heat treated, as previously described, and can, thereafter, have straps stitched thereto and/or be formed to particular configurations to fit various portions of the body, also as described above.

Further, the protective member or pad made in conformity with this last mentioned process could have textile-like reinforcing members embedded therein, if so desired. The reinforcing members could be imbedded in the protective pad by placing a certain portion of the plastisol in the mold cavity and then locating the reinforcing members therein and then adding the remainder of the plastisol to the mold cavity and then placing the mold under heat treatment. Optionally, the first mentioned quantity of plastisol could be heat treated to the point that it was partially gelled and then the reinforcing elements placed thereon and the remainder of the plastisol placed in the mold cavity and thereafter the final heat treatment of the pad carried out.

In this last mentioned manner the reinforcing elements would be prevented from migrating in the plastisol during heat treatment, while the two portions of the plastisol material would, nevertheless, become completely welded together during the final heat treatment.

It has been found that when carrying out the just described method, the plastisol material tends to form a fluid impervious skin on the side thereof engaging the wall of the mold cavity even though no film of plastisol, free of the blowing agent, is supplied thereto.

It will be understood that this invention is susceptible to modification in order to adapt it to different usages and conditions and, accordingly, it is desired to comprehend such modifications within this invention as may fall within the scope of the appended claims.

What is claimed is:

1. A shock absorbing pad adapted to be mounted on the body to provide protection therefor and comprising; a resilient flexible member of a foamed plastisol material, said material being substantially inert to moisture and perspiration and having high tear strength, at least a portion of the outer surface of said member having an integral fluid impervious skin of the same said plastisol material fused directly thereon, said member being contoured on at least one side to fit a designated region of the body, reinforcing means in said member, and endless elastic loop means attached to said reinforcing means for receiving a portion of the body of the wearer of the pad to support the pad in operative position on the body.

2. A shock absorbing pad according to claim 1 in which said loop means comprise elastic strap means, and stitching connecting said strap means to said reinforcing means.

3. A shock absorbing pad according to claim 2 in which said strap means comprise at least two elastic straps connected to said reinforcing means to form at least two loops on said pad.

4. A shock absorbing pad according to claim 1 in which the entire outer surface of said member has said fluid impervious skin fused directly thereto whereby the entire said member is enclosed within an uninterrupted skin.

References Cited

UNITED STATES PATENTS

| | | | |
|---|---|---|---|
| 1,772,922 | 8/1930 | Volz | 2—22 |
| 2,785,407 | 3/1957 | Reeder | 2—22 |
| 2,964,799 | 12/1960 | Roggi et al. | 18—59 |
| 3,044,075 | 7/1962 | Rawlings | 2—22 |
| 3,146,461 | 9/1964 | Kavanagh | 2—2 |
| 3,217,332 | 11/1965 | Gross | 2—16 |
| 1,991,721 | 2/1935 | Becket et al. | 2—2 |
| 3,216,068 | 11/1965 | Williams | 161—161X |
| 3,220,901 | 11/1965 | Holmstrom et al. | 161—161X |
| 3,428,471 | 2/1969 | Tuthill et al. | |

JORDAN FRANKLIN, Primary Examiner

G. H. KRIZMAMICH, Assistant Examiner

U.S. Cl. X.R.

128—90, 132; 161—161